United States Patent
Chang et al.

(10) Patent No.: US 10,775,550 B2
(45) Date of Patent: Sep. 15, 2020

(54) OPTICAL FILM, BACKLIGHT MODULE, AND DISPLAY DEVICE

(71) Applicant: HUIZHOU CHINA STAR OPTOELECTRONICS TECHNOLOGY CO.,LTD., Huizhou Guangdong (CN)

(72) Inventors: Jianyu Chang, Huizhou Guangdong (CN); Yungjui Lee, Huizhou Guangdong (CN); Yuchun Hsiao, Huizhou Guangdong (CN); Shengjer Changchien, Huizhou Guangdong (CN)

(73) Assignee: HUIZHOU CHINA STAR OPTOELECTRONICS TECHNOLOGY CO., LTD., Huizhou, Guangdong (CN)

( * ) Notice: Subject to any disclaimer, the term of this patent is extended or adjusted under 35 U.S.C. 154(b) by 174 days.

(21) Appl. No.: 16/112,186

(22) Filed: Aug. 24, 2018

(65) Prior Publication Data
US 2019/0265403 A1 Aug. 29, 2019

Related U.S. Application Data

(63) Continuation of application No. PCT/CN2018/082147, filed on Apr. 8, 2018.

(30) Foreign Application Priority Data

Feb. 26, 2018 (CN) .......................... 2018 1 0158779

(51) Int. Cl.
F21V 21/00 (2006.01)
F21V 8/00 (2006.01)
(Continued)

(52) U.S. Cl.
CPC .............. *G02B 6/0051* (2013.01); *F21V 9/32* (2018.02); *F21V 9/38* (2018.02); *G02B 6/0088* (2013.01)

(58) Field of Classification Search
CPC ........... F21V 9/32; F21V 9/38; G02B 6/0051; G02B 6/0088
(Continued)

(56) References Cited

U.S. PATENT DOCUMENTS

2015/0260373 A1* 9/2015 Li ........................ C09K 11/565
362/355
2015/0301257 A1* 10/2015 Choi ..................... C09K 11/025
362/607
(Continued)

FOREIGN PATENT DOCUMENTS

| CN | 103487857 A | 1/2014 |
| CN | 105259601 A | 1/2016 |

(Continued)

OTHER PUBLICATIONS

English translation of CN 103487857A, 8 pages. (Year: 2020).*
English translation of CN 107656330 A, 10 pages (Year: 2020).*

*Primary Examiner* — Laura K Tso
(74) *Attorney, Agent, or Firm* — Leong C. Lei

(57) ABSTRACT

The present disclosure relates to an optical film configured on a top of a light guide plate. The optical film is made of quantum dot (QD) material, and the optical film is filled with a plurality of diffusion particles configured to uniformly distribute incident light toward different angles. As such, the backlight emitted from the backlight module may be uniform and may be emitted toward different angles, the color difference and the chromaticity of the display device from different viewing angles may be the same, and the performance of the display device may be improved.

15 Claims, 2 Drawing Sheets

(51) Int. Cl.
*F21V 9/32* (2018.01)
*F21V 9/38* (2018.01)

(58) Field of Classification Search
USPC .......................................... 362/84, 618, 97.1
See application file for complete search history.

(56) References Cited

U.S. PATENT DOCUMENTS

2017/0192146 A1* 7/2017 Yamada ............ G02F 1/133621
2017/0373229 A1* 12/2017 Shin ........................ H01L 33/50

FOREIGN PATENT DOCUMENTS

| CN | 105700062 A | 6/2016 |
| CN | 107656330 A | 2/2018 |

* cited by examiner

OPTICAL FILM, BACKLIGHT MODULE, AND DISPLAY DEVICE

CROSS REFERENCE TO RELATED APPLICATIONS

This application is a continuing application of PCT Patent Application No. PCT/CN2018/082147, entitled "OPTICAL FILM, BACKLIGHT MODULE, AND DISPLAY DEVICE", filed on Apr. 8, 2018, which claims priority to Chinese Patent Application No. 201810158779.8, filed on Feb. 26, 2018, both of which are hereby incorporated in its entireties by reference.

BACKGROUND

1. Technical Field

The present disclosure relates to display field, more particularly to an optical film, a backlight module, and a display device.

2. Description of Related Art

Backlight modules mainly includes a backlight, a light guide plate, at least one optical film, and a plastic frame. The backlight module is usually adopted in the display panel to provide a reliable light source due to the attributes, such as high brightness, long life cycle, uniform brightness. The backlight module includes the side-type backlight module and direct-type backlight module. The backlight module is mainly configured to provide a high luminance and a uniform brightness backlight to a display device. Thin optical components within the backlight module, high luminance and uniform backlight sources, low power-consuming have become the trends of the development.

However, light beams of different colors may have different refractive indices. If the emergent angle of the light beams of the various colors emitted from the backlight module are concentrated, the color difference and the chromaticity of the display device from different viewing angles may be different, and the performance of the display device may be reduced.

SUMMARY

The present disclosure provides an optical film, a backlight module, and a display device. The backlight emitted from the backlight module may be uniform and be emitted toward different angles. As such, the color difference and the chromaticity of the display device from different viewing angles may be the same, and the performance of the display device may be improved.

In one aspect, the present disclosure relates to an optical film configured on a top of a light guide plate, wherein the optical film is made of quantum dot (QD) material, and the optical film is filled with a plurality of diffusion particles configured to uniformly distribute incident light toward different angles.

The optical film is of a single-layer structure.
The optical film is of a multi-layer structure.
At least one layer of the multi-layered optical film is filled with the diffusion particles configured to uniformly distribute the incident light toward different angles.

When each layer of the multi-layered optical film is filled with the diffusion particles configured to uniformly distribute the incident light toward different angles, densities of the diffusion particles in each layer of the multi-layered optical film is configured to be gradually decreased along a direction from a bottom near one side of the light guide plate to a top facing away the light guide plate.

A bottom-layer of the multi-layered optical film is made of red light QD material, and a top-layer of the multi-layered optical film is made of green light QD material.

In another aspect, the present disclosure further relates to a backlight module, including: an optical film configured on a top of a light guide plate, wherein the optical film is made of QD material, and the optical film is filled with a plurality of diffusion particles configured to uniformly distribute incident light toward different angles.

The optical film is of a single-layer structure.
The optical film is of a multi-layer structure.
At least one layer of the multi-layered optical film is filled with the diffusion particles configured to uniformly distribute the incident light toward different angles.

When each layer of the multi-layered optical film is filled with the diffusion particles configured to uniformly distribute the incident light toward different angles, densities of the diffusion particles in each layer of the multi-layered optical film is configured to be gradually decreased along a direction from a bottom near one side of the light guide plate to a top facing away the light guide plate.

A bottom-layer of the multi-layered optical film is made of red light QD material, and a top-layer of the multi-layered optical film is made of green light QD material.

In another example, the present disclosure further relates to a display device, including: a backlight module including an optical film configured on a top of a light guide plate, wherein the optical film is made of QD material, and the optical film is filled with a plurality of diffusion particles configured to uniformly distribute incident light toward different angles.

The optical film is of a single-layer structure.
The optical film is of a multi-layer structure.
At least one layer of the multi-layered optical film is filled with the diffusion particles configured to uniformly distribute the incident light toward different angles.

When each layer of the multi-layered optical film is filled with the diffusion particles configured to uniformly distribute the incident light toward different angles, densities of the diffusion particles in each layer of the multi-layered optical film is configured to be gradually decreased along a direction from a bottom near one side of the light guide plate to a top facing away the light guide plate.

A bottom-layer of the multi-layered optical film is made of red light QD material, and a top-layer of the multi-layered optical film is made of green light QD material.

In view of the above, due to the high conversion rate of the OD material with respect to the light, when the backlight module adopts the optical film doped with the QD material, the brightness may be improved, and the emergent angle may be increased. The optical film may be filled with the diffusion particles configured to uniformly distribute the light beams toward different angles, so as to guarantee the backlight emitted from the backlight module to be uniform and be emitted toward different angles. As such, the color difference and the chromaticity of the display device from different viewing angles may be the same, and the performance of the display device may be improved.

DETAILED DESCRIPTION

To clarify the purpose, technical solutions, and the advantages of the disclosure, embodiments of the invention will now be described more fully hereinafter with reference to the accompanying drawings.

Quantum dot (QD) may enter an excited state when receiving light, and may emit light beams with a specific wavelength, i.e., a specific color, when returning to a ground state from the excited state. The emission spectrum of the QD is mainly controlled by particle size of the QD. The emission spectrum of the QD may be adjusted by changing the particle size of the QD. The QD has a high conversion efficiency, and a high utilization of the light. A half wave width of the emission spectrum of the QD is narrow, and a temperature stability of the QD, and a scattering performance with respect to the light is excellent. Therefore, when a conventional optical film doped with the QD material is adopted in a backlight module, brightness may be improved, and viewing angle may be increased. However, the light beams of different colors may have different refractive indices. In order to scatter the light beams and make the light beams of the different colors emitted from the backlight module to be uniform, so as to guarantee the color difference and the chromaticity of the display device from different viewing angles may be the same, it is necessary to fill the diffusion particles, which is configured to uniformly distribute the incident light toward different angles, into the optical film made of the QD material. As such, the performance of the display device may be improved.

Figure 1:
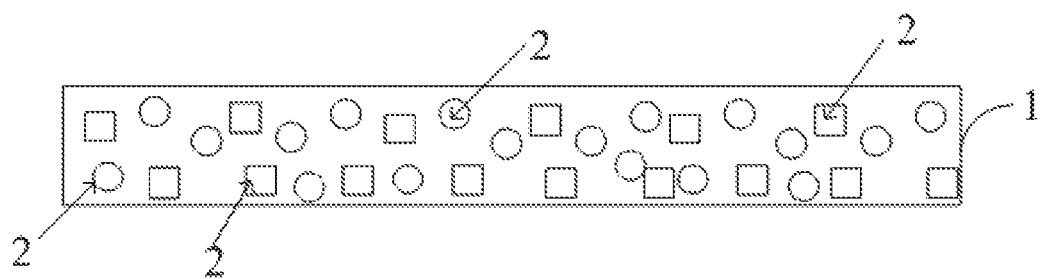
FIG. 1 is a schematic view of an optical film in accordance with one embodiment of the present disclosure.

In one example, as shown in FIG. 1, the present disclosure relates to an optical film 1. The optical film 1 is configured on a top of a light guide plate. The optical film 1 is made of the QD material. The optical film 1 is filled with a plurality of diffusion particles 2 configured to uniformly distribute incident light toward different angles. The optical film 1 is of a single-layer structure.

Figure 2:
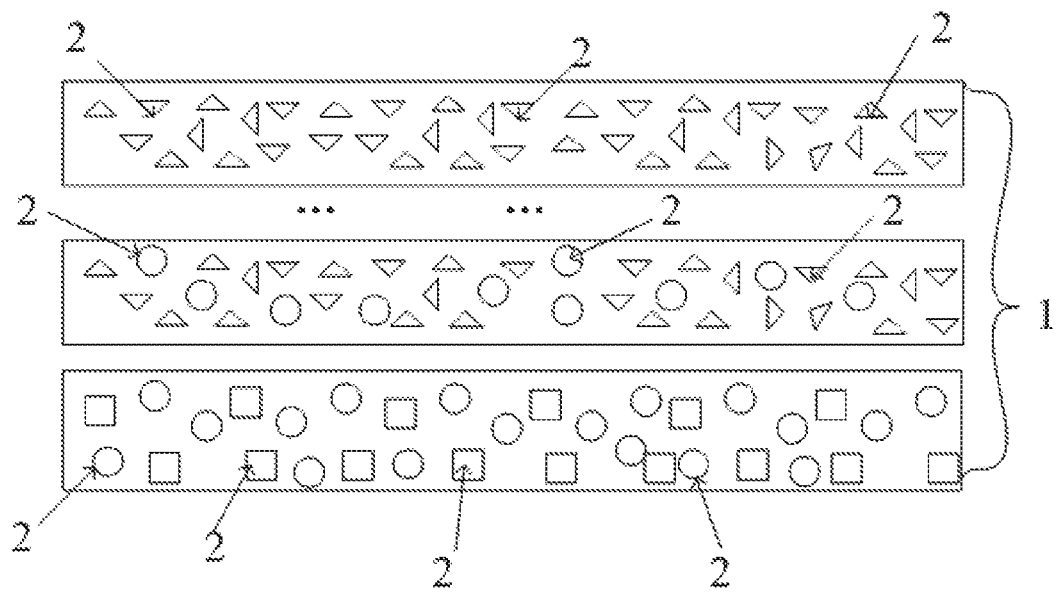
FIG. 2 is a schematic view of an optical film in accordance with another embodiment of the present disclosure.

In one example, as shown in FIG. 2, the present disclosure further relates to the optical film 1. The optical film 1 is configured on the top of the light guide plate. The optical film 1 is made of the QD material. The optical film 1 is filled with the plurality of the diffusion particles 2 configured to uniformly distribute the incident light toward different angles. The optical film 1 is of a multi-layer structure, and at least one layer of the multi-layered optical film 1 is filled with the diffusion particles 2 configured to uniformly distribute the incident light toward different angles.

In another example, in order to guarantee the light beams passing through each layer of the multi-layered optical film may be uniformly distributed, each layer of the multi-layered optical film 1 may be filled with the diffusion particles 2 configured to uniformly distribute the incident light toward different angles, and densities of the diffusion particles 2 in each layer of the multi-layered optical film 1 is configured to be gradually decreased along a direction from a bottom near one side of the light guide plate to a top facing away the light guide plate. As such, the light beams emitted from the light guide plate may be uniform and the light beams may be emitted toward different angles.

It is noted that green light is easily absorbed by the red light QD material to excite the red light QD material to emit red light, which may result in a non-uniform color distribution of emitting light and a non-uniform image. Therefore, in order to reduce secondary absorption of the green light, it is necessary to configure green light QD material on one side of the light guide plate facing away an outlet of the light guide plate. Therefore, a bottom-layer of the multi-layered optical film 1 is made of the red light QD material, and a top-layer of the multi-layered optical film 1 is made of the green light QD material.

Figure 3:
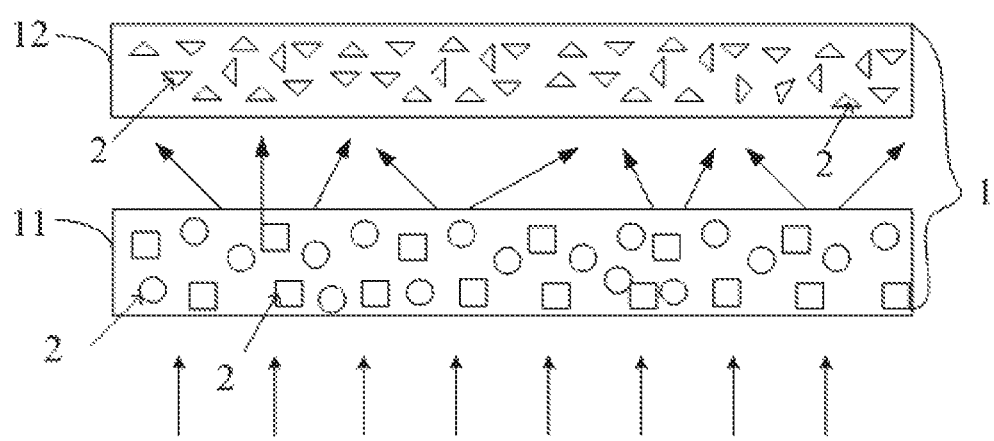
FIG. 3 is a diagram illustrating an application scenario of the optical film shown in FIG. 2.

In one example, as shown in FIG. 3, the optical film 1 may be of a two-layer structure, including a first QD film layer 11, i.e., the bottom-layer, and a second QD film layer 12, i.e., the top-layer, configured on a top of the first QD film layer 11. It is noted that the first QD film layer 11 may be made of the red light QD material, and the second QD film layer 12 may be made of the green light QD material.

The first QD film layer 11 and the second QD film layer 12 are filled with the plurality of the diffusion particles 2 configured to uniformly distribute the incident light toward different angles. Density of the diffusion particles 2 in the first QD film layer 11 is greater than density of the diffusion particles 2 in the second QD film layer 12.

A light source (not shown) is configured to emit blue light toward the first QD film layer 11 from an outlet surface of the light guide plate. The first QD film layer 11 tray be excited by the blue light and may emit the light beams of a first color. The QD material (for example, the red light QD material) of the first QD film layer 11 may absorb the blue light and may emit the light beams of the first color toward different angles. The diffusion particles 2 may diffuse the blue light, which is not absorbed, to the second QD film layer 12 uniformly.

The QD material (for example, the green light QD material) of the second QD film layer 12 may absorb the blue light, which is not absorbed and is emitted from the first QD film layer 11. The second film layer 12 may further transform the absorbed blue light into the light beams of a second color and may emit the light beams toward different angles. The light beams of the first color may also be diffused by the diffusion particles 2 of the second QD film layer 12 and may be uniformly emitted from the second QD film layer 12. Similarly, the blue light, which is not absorbed by the second QD film layer 12, may be diffused by the diffusion particles 2 and may be uniformly emitted from the second QD film layer 12. As such, the backlight emitted from the backlight module may be uniform and may be emitted toward different angles.

The present disclosure further relates to a backlight module, including one of the optical films described above. The optical film in the backlight module has the same structure with one of the optical films described above, and the detail description of the optical film may not be described again.

The present disclosure further relates to a display device, including the backlight module described above. The backlight module of the display device has the same structure with the backlight module described above, and the detail description may not be described again.

In view of the above, due to the high conversion rate of the OD material with respect to the light, when the backlight module adopts the optical film doped with the QD material, the brightness may be improved, and the emergent angle may be increased. The optical film may be filled with the diffusion particles configured to uniformly distribute the light beams toward different angles, so as to guarantee the backlight emitted from the backlight module to be uniform and be emitted toward different angles. As such, the color difference and the chromaticity of the display device from different viewing angles may be the same, and the performance of the display device may be improved.

The figure and the embodiment described according to figure are only for illustration, and the present disclosure is not limited to these embodiments. All other embodiments obtained by a person of ordinary skill in the art based on the embodiments of the present disclosure without creative efforts shall fall within the protection scope of the present disclosure.

What is claimed is:

1. An optical film configured on a top of a light guide plate, wherein the optical film is made of at least one quantum dot (QD) material, and the optical film is filled with a plurality of diffusion particles configured to uniformly distribute incident light toward different angles,
    wherein the optical film comprises a first QD film layer and a second QD film layer stacked on a surface of the first QD film layer, the first QD film layer being made of a first QD material, the second QD film layer being made of a second QD material that is different from the first QD material.

2. The optical film according to claim 1, wherein the optical film is of a multi-layer structure that includes a plurality of QD film layers stacked on each other.

3. The optical film according to claim 2, wherein at least one QD film layer of the plurality of QD film layers of the multi-layer structure of the optical film is filled with the diffusion particles configured to uniformly distribute the incident light toward different angles.

4. The optical film according to claim 3, wherein each QD film layer of the plurality of QD film layers of the multi-layered optical film is filled with the diffusion particles configured to uniformly distribute the incident light toward different angles, and densities of the diffusion particles in the plurality of QD film layers of the multi-layered optical film are arranged to gradually decrease in a direction from a bottom of the optical film that is close to the light guide plate to a top of the optical film that is away from the light guide plate.

5. The optical film according to claim 4, wherein a bottom QD film layer of the plurality of QD film layers of the multi-layer structure of the optical film is made of a red light QD material, and a top QD film layer of the plurality of QD film layers of the multi-layer structure of the optical film is made of a green light QD material.

6. A backlight module, comprising:
    an optical film configured on a top of a light guide plate, wherein the optical film is made of at least one quantum dot (QD) material, and the optical film is filled with a plurality of diffusion particles configured to uniformly distribute incident light toward different angles,
    wherein the optical film comprises a first QD film layer and a second QD film layer stacked on a surface of the first QD film layer, the first QD film layer being made of a first QD material, the second QD film layer being made of a second QD material that is different from the first QD material.

7. The backlight module according to claim 6, wherein the optical film is of a multi-layer structure that includes a plurality of QD film layers stacked on each other.

8. The backlight module according to claim 7, wherein at least one QD film layer of the plurality of QD film layers of the multi-layer structure of the optical film is filled with the diffusion particles configured to uniformly distribute the incident light toward different angles.

9. The backlight module according to claim 8, wherein each QD film layer of the plurality of QD film layers of the multi-layered optical film is filled with the diffusion particles configured to uniformly distribute the incident light toward different angles, and densities of the diffusion particles in the plurality of QD film layers of the multi-layered optical film are arranged to gradually decrease in a direction from a bottom of the optical film that is close to the light guide plate to a top of the optical film that is away from the light guide plate.

10. The backlight module according to claim 9, wherein a bottom QD film layer of the plurality of QD film layers of the multi-layer structure of the optical film is made of a red light QD material, and a top QD film layer of the plurality of QD film layers of the multi-layer structure of the optical film is made of a green light QD material.

11. A display device, comprising:
    a backlight module comprising an optical film configured on a top of a light guide plate, wherein the optical film is made of at least one quantum dot (QD) material, and the optical film is filled with a plurality of diffusion particles configured to uniformly distribute incident light toward different angles,
    wherein the optical film comprises a first QD film layer and a second QD film layer stacked on a surface of the first QD film layer, the first QD film layer being made of a first QD material, the second QD film layer being made of a second QD material that is different from the first QD material.

12. The display device according to claim 11, wherein the optical film is of a multi-layer structure that includes a plurality of QD film layers stacked on each other.

13. The display device according to claim 12, wherein at least one QD film layer of the plurality of QD film layers of the multi-layer structure of the optical film is filled with the diffusion particles configured to uniformly distribute the incident light toward different angles.

14. The display device according to claim 13, wherein each QD film layer of the plurality of QD film layers of the multi-layered optical film is filled with the diffusion particles configured to uniformly distribute the incident light toward different angles, and densities of the diffusion particles in the plurality of QD film layers of the multi-layered optical film are arranged to gradually decrease in a direction from a bottom of the optical film that is close to the light guide plate to a top of the optical film that is away from the light guide plate.

15. The display device according to claim 14, wherein a bottom QD film layer of the plurality of QD film layers of the multi-layer structure of the optical film is made of a red light QD material, and a top QD film layer of the plurality of QD film layers of the multi-layer structure of the optical film is made of a green light QD material.

* * * * *